United States Patent Office 2,913,802
Patented Nov. 24, 1959

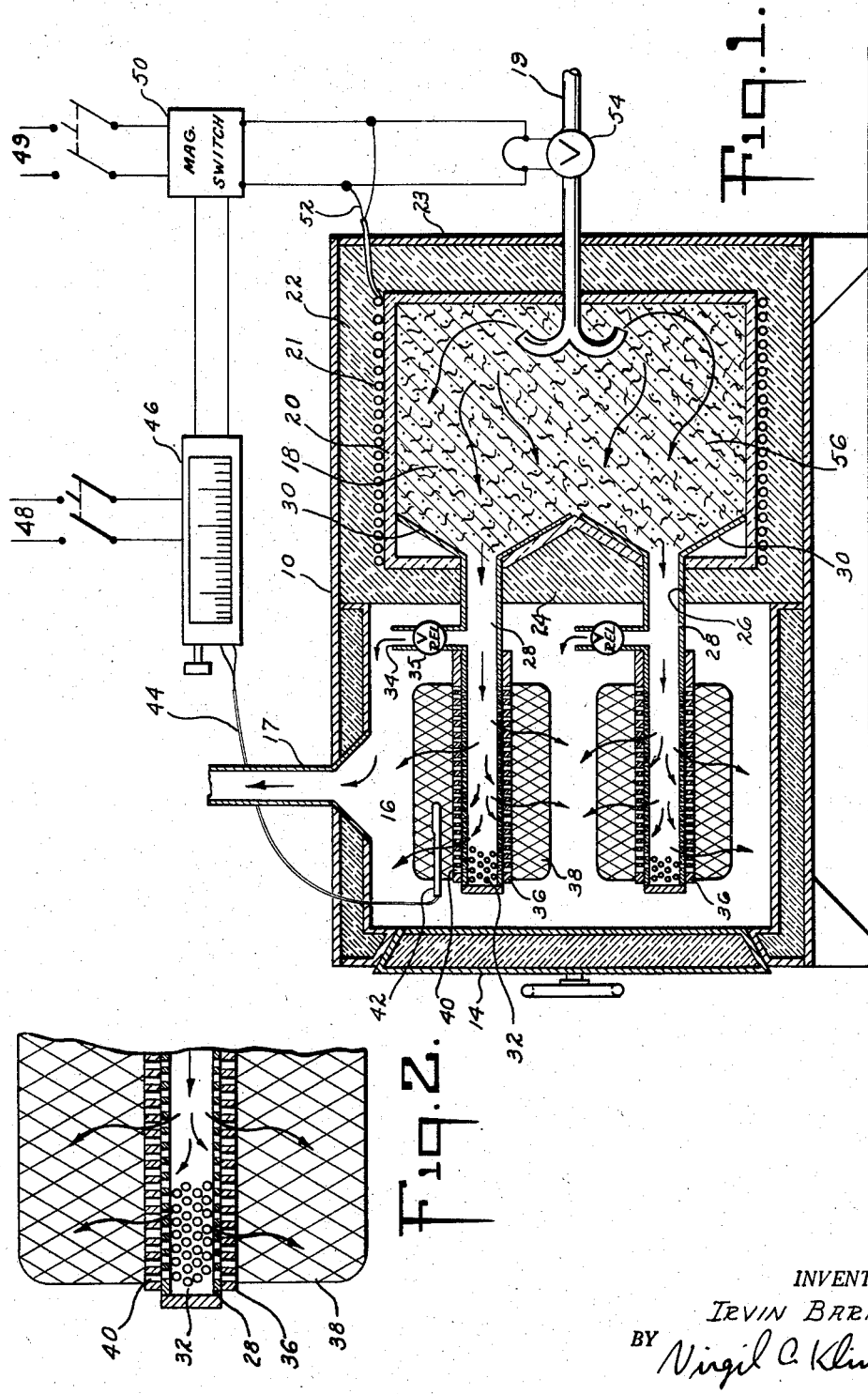
Nov. 24, 1959 — I. BARNETT — 2,913,802
THERMAL MODIFICATION OF ACRYLONITRILE YARNS
Filed July 16, 1953
INVENTOR.
IRVIN BARNETT
BY
ATTORNEY:

2,913,802

THERMAL MODIFICATION OF ACRYLONITRILE YARNS

Irvin Barnett, Somerville, N.J., assignor to Johns-Manville Corporation, New York, N.Y., a corporation of New York Application July 16, 1953, Serial No. 368,421

4 Claims. (Cl. 28—76)

This invention relates to the thermal modification of synthetic polymers which are in filamentary form, and more particularly relates to the thermal modification of yarns composed of polyacrylonitrile and copolymers thereof.

This application is related to copending application Serial No. 345,682, filed March 30, 1953, now Patent No. 2,799,915.

In Patent No. 2,404,714 there are disclosed filamentary materials which are composed of polyacrylonitrile or copolymers of acrylonitrile and various other monomers copolymerizable with acrylonitrile. Such materials have found wide textile usage due to their excellent characteristics of strength, electrical resistivity, substantial inertness to chemicals, flexibility, abrasion resistance, etc. In common with other thermoplastic organic fibrous materials, however, polyacrylonitrile filaments and the textile products formed therefrom possess the undesirable characteristics of fusion and eventual polymer breakdown under heat, and are combustible. Such polyacrylonitrile products have the additional undesirable characteristic of a relatively low heat distortion temperature and exhibit this characteristic in relatively high shrinkage at relatively low temperatures.

Efforts to overcome the adverse characteristics of acrylonitrile polymers when subjected to heat have been made. Surprisingly, it was found that a relatively long heat treatment of a fabric of continuous filament polyacrylonitrile could be employed to improve the thermal stability characteristics of such materials. For example, a sample of fabric composed of thermoplastic continuous filament polyacrylonitrile was heated for two hours at approximately 550° F. with hot air blown through the fabric. The obtained fabric, which has changed in color from pale yellow through brown to black, had a thermal stability completely unexpected in an organic material. This fabric was no longer thermoplastic, did not flame, and did not glow after a source of flame had been removed. Apparently some modification of the polymer took place, since the fabric passed slowly from a thermoplastic to a thermostable form and in the latter form was no longer soluble in known polyacrylonitrile solvents such as dimethylformamide or tetra-methylene cyclic sulphone. While the heat treatment effects these changes, it caused no melting and fusing of the filaments; hence the yarns retained their filamentary structure, and the fabric retained the flexibility and pleasant hand of the corresponding untreated material. Although these unexpected results were obtained with heat treatment of polyacrylonitrile fabrics, no successful method of so thermally modifying yarns composed of either spun staple fiber or continuous filament polyacrylonitrile has been taught. Obviously, for some purposes, it may be particularly advantageous to employ a thermally modified yarn in the subsequent formation of heat-stable textile products.

Accordingly, it is an object of this invention to provide a method of thermally modifying yarns composed of polymers or copolymers containing acrylonitrile.

It is a further object of this invention to provide an apparatus which may be employed in the thermal modification of such materials.

It is also an object of this invention to provide a method and apparatus for thermally modifying continuous filament and spun staple fiber yarns composed of polyacrylonitrile, in which procedure linear shrinkage of the yarns is substantially minimized.

It is an additional and more specific object of this invention to provide a method of modifying packages of yarns composed of polyacrylonitrile.

With the above objects and features in view, the invention consists in the method and apparatus for thermally modifying acrylonitrile yarns, hereinafter described and more particularly defined in the accompanying claims.

The invention will be more fully understood and further objects and advantages will become apparent when reference is made to the following detailed description of a preferred embodiment of the invention and to the accompanying drawings, in which:

Fig. 1 is a sectional elevation, partly schematic, of a device found suitable for thermally modifying yarns of acrylonitrile in accordance with this invention; and, Fig. 2 is an expanded view of a portion of the device shown in Fig. 1.

The preferred method of achieving the thermal modification of filamentary materials composed of a polymer containing acrylonitrile, comprises heating the fabric, yarn or the like at a temperature ranging from approximately 300° F. to the depolymerization temperature of the particular polymers or copolymers employed, normally in the neighborhood of about 650° F., for a period of time sufficient to result in a new filamentary material having improved thermal stability, that is, from approximately one-half hour to several days, with the time being varied inversely to the temperature. Obviously, the temperature may be varied during the period of treatment, preferably, by increasing the treating temperature after partial modification has been accomplished.

The heat treatment of fabrics composed of acrylonitrile is often carried out while maintaining tension in the fabric during thermal modification. While yarns may be modified employing the above-defined conditions, it is apparent that the thermal modification of any substantial quantity of such yarns would be impossible if relatively short spans of the yarns had to be held in tension by mechanical means; for example, it would be impractical to heat treat yarns if tension therein had to be maintained by gripping the ends of a skein or the like.

In accordance with this invention, substantially conventional textile procedures in the handling of yarns are employed; that is, this invention contemplates thermal modification of yarns containing acrylonitrile while such yarns are in the form of conventional yarn packages. In order to successfully thermally modify yarn while in package form, several conditions must be met. Obviously, there must be a uniform distribution of heat throughout the package, and sufficient heating medium, e.g. air, reaching each portion of the yarn in the package for its thermal modification. Secondly, due to the exothermic nature of the thermal modification reaction, the amount of heat added to the package and the heat of the reaction must be carefully balanced so as to avoid excessive temperatures in the package which might cause destruction of part, or all, of the yarn. Additionally, the actual and apparent linear shrinkage of the yarns during thermal modification should be minimized.

In Fig. 1 there is shown a device particularly adapted for the thermal modification of yarns in package form in accordance with this invention. The device generally comprises an oven 10 enclosing, with door 14, a package treatment section 16 and a fluid heating chamber 18. The structure of chamber 18 is generally similar to the structure of a conventional muffle furnace; that is, it comprises a ceramic lining 20, around which are positioned a suitable heating element 21 such as windings of a resistance element. Positioned between the lining 20, the heating element 21 and the outer shell 23 of oven 10 is, preferably, an insulating material 22 such as suitably shaped, conventional inorganic block insulation. Suitable means, as for example, duct system 19, is provided to introduce to chamber 18 the fluid to be used as the thermal modifying medium as hereinafter disclosed. Another suitable duct system 17 is provided to serve as a means for exhausting the heating fluid from section 16.

Separating the package treatment section 16 and the yarn heating fluid supply section 18 of oven 10 is wall 24 which may be of any suitable construction, as for example, a continuation of the block insulation 22. This wall 24 is provided with openings 26, in which are positioned spindles 28.

In the particular embodiment of Fig. 1, spindles 28 generally extend into the package treatment section 16 through wall 24 and have one end retained and positioned in the heating fluid supply section 18 as by flanges 30 or the like. The spindles 28 should be fabricated with sufficient strength to support the weight of the packages to be treated as hereinafter defined, and may be formed of any suitable structural material. The spindle 28 is provided with numerous perforations 32 and may contain a duct 34 and relief valve 35. Preferably, the length of the perforated area of the spindles is no greater than that required to extend through to the end of the package core, as will be more particularly pointed out hereinafter.

The yarn which is to be treated in accordance with this invention is wrapped upon a core 36 to form a yarn package 38. The core 36 may be formed of any suitable material, but, preferably, not one containing any substantial amount of ferrous metal. Suitable for use is, for example, a non-ferrous metal, a ceramic material, a fiber-cement composition, etc. It is preferred that the package core 36 not be formed of a material containing a ferrous metal since it has been found that the thermal modification reaction is catalyzed thereby and is often rendered uncontrollable if the yarn is positioned in close proximity to an element containing metallic iron. As particularly illustrated in Fig. 2, the package core 36 is provided with a diameter sufficiently large to allow it to overlie spindle 28 and, with perforations 40 which are of the proper number, size, and distribution, to communicate with the perforations 32 of spindle 28, and to extend over the entire core area which is overlaid by the yarn to be treated.

The remaining elements of the exemplary apparatus of this invention are those essential for control of the treating process in accordance with this invention, and comprise a thermocouple 42 of suitable size for insertion into the yarn package 38, which is connected by means of conductor 44 to pyrometer 46. Pyrometer 46 controls, by means of current from its power source 48, the flow of power from source 49 through the magnetic switch 50, and hence, controls the current fed to the heating element 21 through conductor 52, and also the operation of solenoid valve 54 in duct system 19.

In heat treating a yarn composed of acrylonitrile in accordance with this invention, a package of yarn 38 of suitable dimensions is wound on package core 36, which is then positioned upon spindle 28. As may be seen from the drawing, it is preferred that the yarn forming the package 38 be wound on core 36 so that the area of perforations 40 thereof is covered by the yarn turns. Similarly, package core 36 overlies all of that area of spindle 28 through which are perforations 32. The thermocouple 42 is inserted in the yarn package 38, and is preferably positioned therein to give a relatively mean reading.

With the yarn package or packages properly positioned, the pyrometer 46 is set at the temperature desired within the yarn package, and current is fed from source 48 to the pyrometer 46. When the temperature indicated by thermocouple 42 is below the pyrometer setting, the magnetic switch 50 is actuated, and power passes to the heating element 21 and opens valve 54. Obviously, means may be provided to operate the power feed and air feed independently and yet in response to action of thermocouple 42.

When solenoid valve 54 is open, the fluid, e.g. air, employed for heating the yarn to be treated flows through duct 19 into fluid heating chamber 18. Preferably, chamber 18 contains material such as a metal mesh 56 which serves to distribute the air throughout the heating chamber and retain it therein for a time sufficient to allow all of the medium to be brought to the desired temperature. The heated air then passes from chamber 18 into spindle 28 and through the spindle perforations 32 and the perforations 40 in the package core 36 and thence into the yarn package 38. It is apparent that sufficient pressure differential is required in the system to cause flow of the heating gases from chamber 18 through the spindle 28, core 36, and thence yarn package 38. This pressure differential may, of course, be obtained from positive fluid pressure in duct system 19 or through use of a partial vacuum in duct system 17. In cases where it is desirable to provide a flow of heating gases to the outside surfaces of the package, as well as therethrough, relief valve 35 may be employed, and its closing force balanced against the pressure within spindle 28. Duct 17 is provided to exhaust the desired amount of heating medium from the system. Obviously, suitable means (not shown) may be provided to recycle this exhausted medium from exhaust duct 17 to feed duct 19.

As indicated in copending application Serial No. 345,682, a serious problem when thermally modifying material composed of acrylonitrile is shrinkage, due to the relatively low heat distortion of the polymeric material.

It has been found advantageous in minimizing the apparent linear shrinkage of yarns to impart to them, proir to their being wound on the package core 36 to form the yarn package 38, a substantial amount of twist. As is well known, the amount of twist desirable in any textile yarns is a function of the yarn size. With yarns of polymeric materials, the twist in turns per inch is conveniently determined by the quotient of a Twist Constant divided by the square root of the denier of the yarn employed. Under these circumstances, in order to eliminate the variable of yarn size or denier, it is desirable to express herein the twist to be employed in the yarns by recitation of the Twist Constant to be employed in calculating the desired turns per inch. When treating yarns to further minimize their apparent shrinkage in accordance with this invention, therefore, the twist in the yarn to be modified should be determined by employing a minimum Twist Constant of approximately 70 and a maximum Twist Constant of about 250. Some twist is ordinarily present in the original yarn, and the desired turns per inch, as determined by using the recited Twist Constant, should take this original twist into consideration. Lower values may be employed than the twist indicated by use of the minimum Twist Constant recited, but the lower number of turns per inch obtained would probably not result in sufficient advantage to warrant the twisting step. Higher twist than that recited may also be employed, but such higher twist tends to result in a brittle yarn after heat treatment.

The invention defined herein is effective in thermally modifying yarns composed of any polymer containing acrylonitrile which is known to be susceptible to such treatment, and particularly effective in modifying a polymer or copolymer that contains at least 85% acrylonitrile units in the polymer molecule, with the remaining 15% a monomer copolymerizable with acrylonitrile, as, for example, styrene, butadiene, methyl vinyl ketone, methacrylic acid, vinyl pyridines, vinyl chloride, vinyl acetate, vinylidene, vinylidene cyanide, etc., or a plurality of such monomers.

It is to be understood that the invention disclosed herein is not limited to the formation of completely modified filamentary materials composed of acrylonitrile polymers or copolymers. On the other hand, it has been found that products of substantial utility may be obtained by effecting the procedure to result in only partial modification of such materials. As heretofore indicated, full modification of such materials results in a filamentary material which is non-ignitable, will not glow, and which has excellent resistance to thermal distortion. While partial modification does not result in a filamentary material which is completely non-ignitible and non-glowing, it results in a substantially non-thermoplastic product which is substantially resistant to flame and glow, and which exhibits the characteristics of substantial heat stability and a relatively high heat distortion temperature and thus relatively low shrinkage at elevated temperatures, to substantially the same degree as the completely modified materials. Such products, in addition to exhiibting the aforementioned characteristics, substantially retain the excellent abrasion resistance and strength of the unmodified filamentary materials.

The degree of thermal modification of such materials may be conveniently expressed on the basis of percent by weight of filamentary material remaining after exposure to an igniting flame and removal of all volatile and flammable constituents thereby. Obviously, in order to obtain the desired useful materials, the thermal modification must be sufficient that the material remaining after such a test procedure retains the filamentary character of the original material. The preferred partially modified filamentary materials composed of acrylonitrile polymers or copolymers are those which indicate at least approximately 60% by weight of residual non-ignitable filamentary material when tested as defined. This content of non-ignitable filamentary material is necessary in order that the partly modified material have sufficient heat stability to retain its filamentary form and the strength necessary for service use at elevated temperatures. Often it is preferred that the materials be only converted to no more than 95% by weight of non-ignitible material to insure adequate abrasion resistance and tensile and flexural strength for their intended uses. Yarns which have been subjected to such partial thermal modification have particular utility in services where a yarn which is substantially flame-resistant, dimensionally stable under heat, and high in tensile and flexural strength and abrasion resistance is desirable or necessary, as for example, sewing thread for thermally modified acrylonitrile fabrics.

It will be understood that the details given herein are for the purpose of illustration, not restriction, and that variations within the spirit of the invention are intended to be included in the scope of the appended claims.

What I claim is:

1. The method of thermally modifying yarns composed of a polymer containing acrylonitrile while in package form, which comprises maintaining a flow of heated air through said yarn package, controlling the temperature of the heated fluid in response to the temperature within such yarn package, and maintaining the temperature within said yarn package within the range from approximately 300° F. to the depolymerization temperature of the polymer for at least approximately one-half hour whereby said package of yarn composed of a polymer containing acrylonitrile is exposed to said modifying temperatures for a period of time sufficient to result in a new filamentary material which contains at least approximately 60% by weight of a thermostable, non-ignitible, thermally modified material.

2. The method of thermally modifying yarns composed of a polymer containing acrylonitrile while in package form, which comprises maintaining a flow of heated air through said yarn package, controlling the volume flow and temperature of the heated fluid in response to the temperature within such yarn package, and maintaining the temperature within said yarn package within the range from approximately 300° F. to the depolymerization temperature of the polymer for at least approximately one-half hour whereby said package of yarn composed of a polymer containing acrylonitrile is exposed to said modifying temperatures for a period of time sufficient to result in a new filamentary material which contains at least approximately 60% by weight of a thermostable, non-ignitible, thermally modified material.

3. The method of thermally modifying yarns composed of a polymer containing acrylonitrile, which comprises providing in said yarns a twist determined by employing a Twist Constant of approximately 70–250, winding said yarns to form a yarn package, maintaining a flow of heated air through said yarn package to maintain a temperature therein within the range from approximately 300° F. to the depolymerization temperature of the polymer for at least approximately one-half hour whereby said package of yarn composed of a polymer containing acrylonitrile is exposed to said modifying temperatures for a period of time sufficient to result in a new filamentary material which contains at least approximately 60% by weight of a thermostable, non-ignitible, thermally modified material.

4. In the method of thermally modifying yarns composed of a polymer containing acrylonitrile which comprises subjecting said yarns to air at a temperature within the range from approximately 300° F. to the depolymerization temperature of the polymer for at least approximately one-half hour whereby said yarns composed of a polymer containing acrylonitrile are exposed to said modifying temperatures for a period of time sufficient to result in a new filamentary material which contains at least approximately 60% by weight of a thermostable, non-ignitible, thermally modified material, the improvement which comprises imparting to said yarns, prior to thermal modification, a twist determined by employing a Twist Constant of approximately 70–250.

References Cited in the file of this patent

UNITED STATES PATENTS

| | | |
|---|---|---|
| 2,116,064 | Dreyfus et al. | May 3, 1938 |
| 2,152,620 | Morton | Mar. 28, 1939 |
| 2,304,089 | Heberlein | Dec. 8, 1942 |
| 2,304,897 | Drum et al. | Dec. 15, 1942 |
| 2,394,540 | Finzel | Feb. 12, 1946 |
| 2,420,565 | Rugeley et al. | May 13, 1947 |
| 2,686,339 | Holt | Aug. 17, 1954 |
| 2,779,977 | Wilkie | Feb. 5, 1957 |

OTHER REFERENCES

Houtz: Textile Res. J., November 1950 (pages 786 to 801).

Larsen et al.: Scientific Monthly, December 1949, vol. LXIX (pages 414 to 418).